US011199339B2

(12) United States Patent
Clayton

(10) Patent No.: US 11,199,339 B2
(45) Date of Patent: Dec. 14, 2021

(54) REMOTE HEAT TRANSFER DEVICE

(71) Applicant: AIRSOURCE VENTILATION LIMITED, Manchester (GB)

(72) Inventor: David Clayton, Manchester (GB)

(73) Assignee: AIRSOURCE VENTILATION LIMITED, Manchester (GB)

(*) Notice: Subject to any disclaimer, the term of this patent is extended or adjusted under 35 U.S.C. 154(b) by 105 days.

(21) Appl. No.: 16/612,550

(22) PCT Filed: May 10, 2018

(86) PCT No.: PCT/GB2018/051267
§ 371 (c)(1),
(2) Date: Nov. 11, 2019

(87) PCT Pub. No.: WO2018/206967
PCT Pub. Date: Nov. 15, 2018

(65) Prior Publication Data
US 2020/0224919 A1    Jul. 16, 2020

(30) Foreign Application Priority Data
May 12, 2017   (GB) ........................... 1707623

(51) Int. Cl.
*F24F 12/00* (2006.01)
*F24F 5/00* (2006.01)
(Continued)

(52) U.S. Cl.
CPC ............ *F24F 12/003* (2013.01); *F24F 5/001* (2013.01); *F25B 13/00* (2013.01); *F24F 1/0007* (2013.01); *F24F 2203/104* (2013.01)

(58) Field of Classification Search
CPC .......... F24F 12/003; F24F 5/001; F24F 1/007; F24F 12/001; F25B 25/005; F04B 49/20
(Continued)

(56) References Cited

U.S. PATENT DOCUMENTS 5,253,805 A   10/1993  Swenson
5,320,166 A    6/1994  Swenson
(Continued)

FOREIGN PATENT DOCUMENTS

EP    2634500 A2   9/2013
EP    2899477 A1   7/2015
(Continued)

OTHER PUBLICATIONS

GB Examination Report for Application No. GB1707623.3, dated Apr. 12, 2019, 5 pages.
(Continued)

*Primary Examiner* — David J Teitelbaum
(74) *Attorney, Agent, or Firm* — Hoffman Warnick LLC

(57) ABSTRACT

A remote heat transfer device for use with an air handling unit comprises: a vapour-compression circuit, the vapour-compression circuit comprising a first heat exchanger adapted to exchange heat between a refrigerant in the vapour compression circuit and a first heat transfer fluid; and a first outlet arranged to provide the first heat transfer fluid to an air supply passage of the air handling unit, so that the first heat transfer fluid exchanges heat with supply air passing through the air supply passage.

17 Claims, 2 Drawing Sheets

Figure 1:
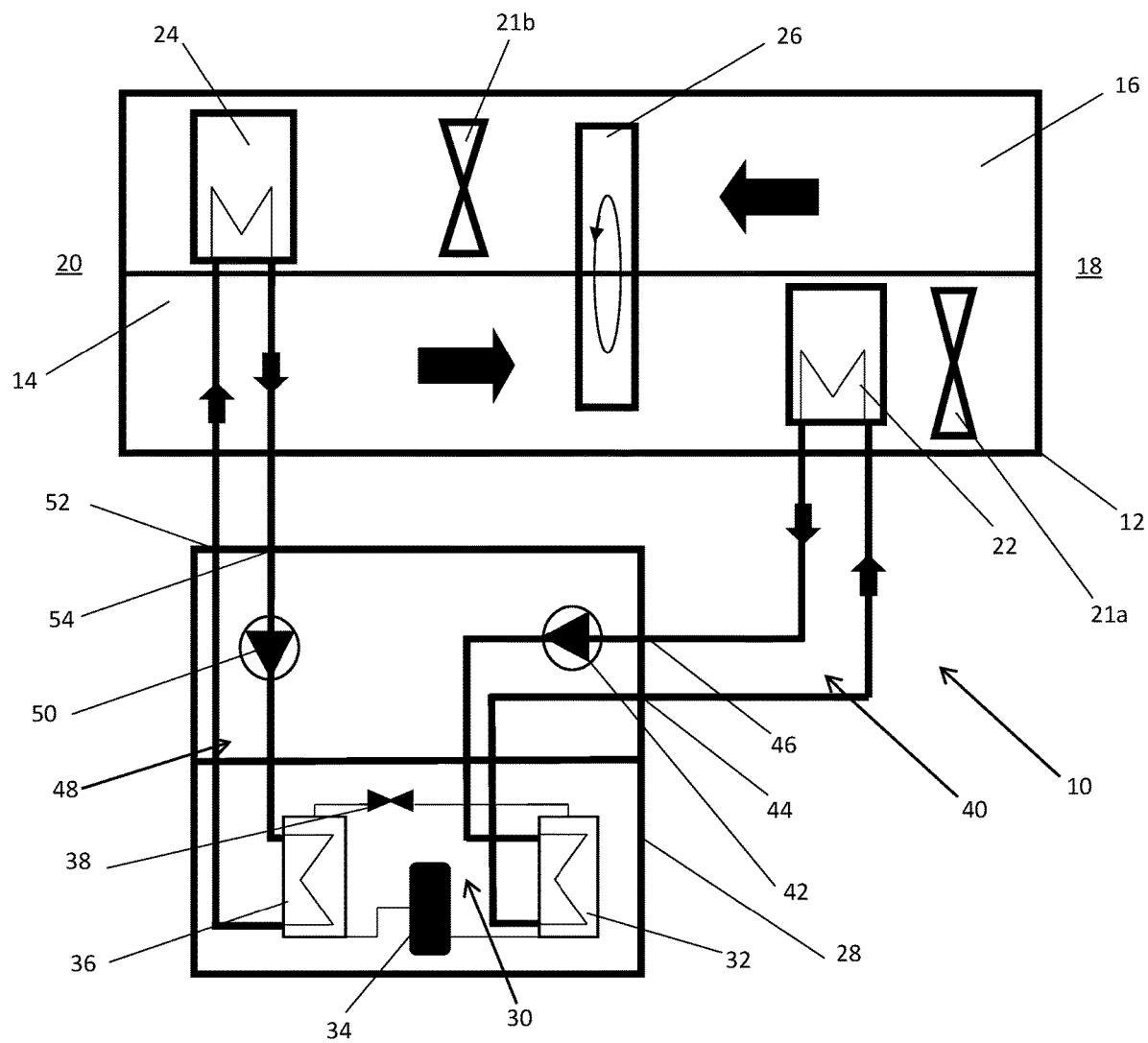

(51) Int. Cl.
    *F25B 13/00*     (2006.01)
    *F24F 1/0007*     (2019.01)

(58) Field of Classification Search
    USPC .......................................................... 417/326
    See application file for complete search history.

(56) References Cited

U.S. PATENT DOCUMENTS

| | | | |
|---|---|---|---|
| 2002/0017110 A1 | 2/2002 | Chiu et al. | |
| 2004/0134211 A1 | 7/2004 | Lee et al. | |
| 2006/0201183 A1* | 9/2006 | Otake | F24F 3/1423 62/271 |
| 2012/0023988 A1* | 2/2012 | Togano | F24F 3/147 62/159 |
| 2013/0205818 A1 | 8/2013 | Morimoto et al. | |
| 2014/0245769 A1* | 9/2014 | Vandermeulen | F25B 29/006 62/238.3 |
| 2015/0276243 A1 | 10/2015 | Gertis | |
| 2016/0245539 A1 | 8/2016 | Motomura et al. | |
| 2017/0176077 A1* | 6/2017 | Knatt | F25C 1/12 |

FOREIGN PATENT DOCUMENTS

| | | |
|---|---|---|
| FR | 2941520 A1 | 7/2010 |
| WO | 2009053726 A2 | 4/2009 |
| WO | 2014141381 A1 | 9/2014 |

OTHER PUBLICATIONS

GB Combined Search and Examination Report for Application No. GB1707623.3, dated Oct. 24, 2017, 9 pages.

PCT International Search Report and Written Opinion for International Application No. PCT/GB2018/051267, dated Jul. 23, 2018, 13 pages.

\* cited by examiner

REMOTE HEAT TRANSFER DEVICE

The invention relates to a remote heat transfer device for an air handling system, an air handling unit, an air handling system, and a method of air handling.

Air handling units are used for heating and cooling fresh air for supply to HVAC system of buildings. They often employ heat pumps to improve their energy efficiency, with the heat pumps generally using R410a refrigerant, which has high global warming potential (GWP), with a GWP value of 2400. There is a drive to reduce the use of refrigerants with high GWP values, and to move towards refrigerants with lower GWP values. However, in general, refrigerants with low GWP values are flammable. A leak of flammable refrigerant represents a significant fire hazard.

According to a first aspect of the invention, there is provided a remote heat transfer device for use with an air handling unit, the remote heat transfer device comprising: a vapour-compression circuit, the vapour-compression circuit comprising a first heat exchanger adapted to exchange heat between a refrigerant in the vapour compression circuit and a first heat transfer fluid; and a first outlet arranged to provide the first heat transfer fluid to an air supply passage of the air handling unit, so that the first heat transfer fluid exchanges heat with supply air passing through the air supply passage.

The remote heat transfer device is advantageous, as it means that the refrigerant in the vapour compression circuit is located remotely from the air handling unit, with the first heat transfer fluid used to carry fluid to or remove fluid from the supply air passing through the air supply passage of the air handling unit. The refrigerant in the vapour compression circuit may thus operate in isolation from the air supply passage such that there is no direct fluid path for refrigerant vapour to enter the air supply air passage in the event of leakage from the vapour-compression circuit. This means that the risk of refrigerant getting to an occupied area, such as a room to which the air handling unit supplies air, is reduced. This avoids contamination of the occupied area, and, in the case of a flammable low GWP refrigerant, significantly reduces the risk of fire.

In an example, the remote heat transfer device comprises a first inlet adapted to receive first heat transfer fluid returned from the air handling unit, the first inlet in fluid communication with the first outlet via the first heat exchanger to form a first circulation system. Recirculating the first heat transfer fluid is advantageous, as it means that first heat transfer fluid (and its thermal energy) can be reused.

In an example, the remote heat transfer device comprises a first pump for pumping first heat transfer fluid to the air supply passage, the first pump controllable to control flow rate of first heat transfer fluid to the air supply passage. The first pump provides a straightforward means for supplying the first heat transfer fluid to the air supply passage, and the first pump being controllable allows the rate of heat exchange between the first heat transfer fluid and the supply air can be controlled, thereby allowing the temperature of the supply air supplied by the air handling unit to be controlled.

In an example, the vapour compression circuit comprises a second heat exchanger adapted to exchange heat with a second heat transfer fluid, the remote heat transfer device comprising a second outlet arranged to provide the second heat transfer fluid to a return-from-area passage of the air handling unit, so that the second heat transfer fluid exchanges heat with return air passing through the return-from-area passage. This allows thermal energy to be passed to or from the second heat transfer fluid in the vapour compression circuit, thereby increasing the efficiency of the vapour compression circuit.

In an example, the remote heat transfer comprises a second inlet adapted to receive second heat transfer fluid returned from the air handling unit, the second inlet in fluid communication with the second outlet via the second heat exchanger to form a second circulation system. Recirculating the second heat transfer fluid is advantageous, as it means that second heat transfer fluid (and its thermal energy) can be reused.

In an example, the remote heat transfer comprises a second pump for pumping second heat transfer fluid to the return-from-area passage, the second pump controllable to control flow rate of second heat transfer fluid to the return-from-area passage. The second pump provides a straightforward means for supplying the second heat transfer fluid to the air supply passage, and the second pump being controllable means allows the rate of heat exchange between the second heat transfer fluid and the supply air can be controlled.

In an example, the remote heat transfer device is arranged to operate in a heat pump mode, and, in the heat pump mode, the remote heat transfer device heats the first heat transfer fluid using the first heat exchanger so as to heat the supply air. In an example, in the heat pump mode, the remote heat transfer device draws heat from the second heat transfer fluid using the second heat exchanger.

In an example, the remote heat transfer device is arranged to operate in a refrigeration mode, and in the refrigeration mode, the remote heat transfer device cools the first heat transfer fluid using the first heat exchanger so as to cool the supply air. In an example, in the refrigeration mode, the remote heat transfer device heats the second heat transfer fluid using the second heat exchanger.

In an example, in the heat pump mode and in the refrigeration mode, the vapour compression circuit operates a Carnot cycle.

In an example, the vapour compression circuit comprises at least one compressor, the remote heat transfer device switchable between the heat pump mode and the refrigeration mode by switching polarity of the at least one compressor. This means that the same components can be used to provide the refrigeration and heat pump cycles, with switching between the cycles effected in a straightforward manner.

In an example, the vapour compression circuit comprises the refrigerant, the refrigerant having a GWP value less than or equal to 650. In an example, the vapour compression circuit comprises the refrigerant, the refrigerant having a GWP value less than or equal to 3. In an example, the refrigerant is R290. Such refrigerants are better for the environment, and the use of the remote heat transfer device reduces the risk of fire when they are used, as described above.

In an example, the first heat transfer fluid is a liquid, for example water. Water has a relatively high specific heat capacity and provides a safe fluid for carrying thermal energy to the air handling unit.

In an example, the remote heat transfer device comprises a second vapour-compression circuit, the second vapour-compression circuit comprising a third heat exchanger adapted to exchange heat between a refrigerant in the second vapour compression circuit and the first transfer fluid. Using two independent circuits reduces the amount of refrigerant required in each circuit to achieve the same total heating/cooling. This keeps the flammable charge below the maximum allowable limit for safe operation, which is typically 5 kg. The minimum operational capacity for a compressor is typically 20%, so using two circuits gives a total unit minimum capacity of 10%, which provides improved flexibility in heating and cooling fresh air, to achieve the required supply air temperature at moderate atmospheric temperature.

According to a second aspect of the invention, there is provided an air handling unit comprising an air supply passage for receiving supply air from the atmosphere and supplying the supply air therefrom for delivery to an occupied area, wherein the air supply passage comprises a supply heat exchanger adapted to receive first heat transfer fluid from a remote heat transfer device, the supply heat exchanger adapted to exchange heat between the first heat transfer fluid and the supply air.

Receiving the first heat transfer fluid from the remote heat transfer device is advantageous, as it means that the refrigerant in the vapour compression circuit is located remotely from the air handling unit, with the first heat transfer fluid used to carry fluid to or remove fluid from the supply air passing through the air supply passage of the air handling unit. The refrigerant in the vapour compression circuit may thus operate in isolation from the air supply passage such that there is no direct fluid path for refrigerant vapour to enter the air supply air passage in the event of leakage from the vapour-compression circuit. This means that the risk of refrigerant getting to the occupied area, such as a room to which the air handling unit supplies air, is reduced. This avoids contamination of the occupied area, and, in the case of a flammable low GWP refrigerant, significantly reduces the risk of fire.

In an example, the air handling unit comprises a return-from-area passage for receiving return air from the occupied area and supplying the return air to the atmosphere, wherein the return-from-area passage comprises a return heat exchanger in fluid communication with the second outlet of the remote heat transfer device to receive second heat transfer fluid from the remote heat transfer device, the return heat exchanger adapted to exchange heat between the second heat transfer fluid and the return air. This allows thermal energy to be passed to or from the second heat transfer fluid in the vapour compression circuit, thereby increasing the efficiency of the vapour compression circuit present in the remote heat transfer device.

In an example, the air handling unit comprises a recovery wheel for exchanging heat between the return air and the supply air.

According to a third aspect of the invention, there is provided an air handling system comprising a remote heat transfer device as described above and an air handling unit as described above.

According to a fourth aspect of the invention, there is provided a method of air handling, the method comprising: exchanging heat between a refrigerant in a vapour-compression circuit and a first heat transfer fluid; providing the first heat transfer fluid to an air supply passage, wherein the air supply passage receives supply air from the atmosphere and supplies the supply air therefrom, for delivery to a room; and exchanging heat between the first heat transfer fluid and the supply air in the air supply passage.

The method is advantageous, as it means that the refrigerant in the vapour compression circuit is located remotely from the air handling unit, with the first heat transfer fluid used to carry fluid to or remove fluid from the supply air passing through the air supply passage of the air handling unit. This means that the risk of refrigerant leaking into an occupied area, such as a room to which the air handling unit supplies air, is reduced. This avoids contamination of the occupied area, and, in the case of a flammable low GWP refrigerant, significantly reduces the risk of fire.

In an example, the method comprising: exchanging heat between the refrigerant in the vapour-compression circuit and a second heat transfer fluid; providing the second heat transfer fluid to a return-from-area passage, wherein the return-from-area passage receives return air from the room and supplies the return air to the atmosphere; and exchanging heat between the second heat transfer fluid and the return air. This allows thermal energy to be passed to or from the second heat transfer fluid in the vapour compression circuit, thereby increasing the efficiency of the vapour compression circuit present in the remote heat transfer device.

For a better understanding of the invention reference is made, by way of example only, to accompanying FIG. 1, which shows a schematic drawing of an air handling system 10.

The air handling system 10 comprises an air handling unit 12. The air handling unit 12 comprises an air supply passage 14 and a return-from-area passage 16, each in fluid communication with an occupied area 18 (for example, a room) and the atmosphere 20 (i.e. outside the room). In the present example, the air supply passage 14 and the return-from-area passage 16 are in direct fluid communication with the occupied area 18 and the atmosphere 20. However, it will be appreciated that in other examples, either or both of the air supply passage 14 and the return-from-area passage 16 is indirectly connected to either or both of the occupied area 18 and the atmosphere 20 using ducting (not shown). The occupied area 18 is isolated from the atmosphere 20, aside from through the air handling unit 12.

The air supply passage 14 and the return-from-area passage 16 are of approximately equal cross sectional areas. The air supply passage 14 comprises an air supply fan 21a, the air supply fan 21a operable to drive supply air along the air supply passage 14 from the atmosphere 20 towards the occupied area 18. The return-from-area passage 16 comprises an air return fan 21b, the air return fan 21b operable to drive return air along the return-from-area passage 16 from the occupied area 18 towards the atmosphere 20.

The air handling unit 10 comprises a supply heat exchanger 22 located in the air supply passage 14. The supply heat exchanger 22 is operable to exchange heat between the supply air and a first heat transfer fluid, as described in more detail below. The air handling unit 10 comprises a return heat exchanger 24 located in the return-from-area passage 16. The return heat exchanger is operable to exchange heat between the return air and a second heat transfer fluid, as described in more detail below. The first heat transfer fluid is water. The second heat transfer fluid is water.

The air handling unit 12 comprises a recovery wheel 26, which is formed of a heat absorbent material. The recovery wheel 26 is positioned with its axis of rotation aligned with the air supply passage 14 and the return-from-area passage 16, with a first half of the recovery wheel 26 in the air supply passage 14 and a second half of the recovery wheel in the return-from-area passage 16.

The air handling system 10 comprises a remote heat transfer device 28. The remote heat transfer device 28 comprises a vapour-compression circuit 30. The vapour compression circuit 30 comprises a first heat exchanger 32, a compressor 34, a second heat exchanger 36 and a metering device 38. The metering device 38 is an expansion valve 38. The first heat exchanger 32 is connected to the compressor 34 and the expansion valve 38. The second heat exchanger 36 is connected to the compressor 34 and the expansion valve 38.

The first heat exchanger 32 is part of a first circulation system 40, which comprises the supply heat exchanger 22 and a first pump 42. The first heat exchanger 32 is operable to exchange heat between refrigerant in the vapour-compression circuit 30 and the first heat transfer fluid in the first circulation system 40, as described in more detail below. The refrigerant is R290.

The remote heat transfer device 28 comprises a first outlet 44, through which the first heat exchanger 32 is connected to the supply heat exchanger 22, as part of the first circulation system 40. The remote heat transfer device 28 comprises a first inlet 46, through which the supply heat exchanger 22 is connected to the first pump 42, as part of the first circulation system 40. The first pump 42 is located in the remote heat transfer device 28, and connects to the first heat exchanger 32.

The second heat exchanger 36 is part of a second circulation system 48, which comprises the return heat exchanger 24 and a second pump 50. The second heat exchanger 36 is operable to exchange heat between refrigerant in the vapour-compression circuit 30 and the second heat transfer fluid in the second circulation system 48, as described in more detail below.

The remote heat transfer device 28 comprises a second outlet 52, through which the second heat exchanger 36 is connected to the return heat exchanger 24, as part of the second circulation system 48. The remote heat transfer device 28 comprises a second inlet 54, through which the return heat exchanger 24 is connected to the second pump 50, as part of the second circulation system 48. The second pump 50 is located in the remote heat transfer device 28, and connects to the second heat exchanger 36.

The remote heat transfer device 28 is located remotely from the air handling unit 12 and the occupied area 18, to reduce the risk of the refrigerant leaking into the air supply passage 14, the return-from-area passage 16 or the occupied area 18, and thereby reducing the risk of fire. Pipework is provided between the remote heat transfer device 28 and the air handling unit 12 to allow the first and second heat transfer fluids to flow in the first and second circulation systems 40, 48 respectively. Otherwise, the remote heat transfer device 28 is sealed. The remote heat transfer device 28 and the air handling unit 12 are separate units.

In use, refrigerant flows around the vapour-compression circuit 30, driven by the compressor 34. The first pump 42 drives the first heat transfer fluid around the first circulation system 40, so that the refrigerant exchanges heat with the first heat transfer fluid in the first heat exchanger 32. The second pump 54 drives the second heat transfer fluid around the second circulation system 48, so that the refrigerant exchanges heat with the second heat transfer fluid in the second heat exchanger 36.

The supply fan 21a drives supply air along the air supply passage 14, so that the air supply passage 14 receives the supply air from the atmosphere 20 and supplies the supply air from the supply passage 14 into the occupied area 18. The first heat transfer fluid exchanges heat with the supply air in the supply air heat exchanger 22. The first heat transfer fluid returns to the first heat exchanger 32 via the first pump 42.

The return fan 21b drives return air along the return-from-area passage 16, so that the return-from-area passage 16 receives the return air from the occupied area and supplies the return air to the atmosphere 20. The second heat transfer fluid exchanges heat with the return air in the return air heat exchanger 24. The second heat transfer fluid returns to the second heat exchanger 36 via the second pump 50.

The recovery wheel 26 exchanges heat between the return air and the supply air, by absorbing heat from a warmer of the return air and the supply air, and passing heat to a cooler of the return air and the supply air.

The remote heat transfer device 28 is arranged to operate in a heat pump and in a refrigeration mode, as described below. The vapour-compression circuit 30 is a reversible heat pump.

In the heat pump mode, the vapour-compression circuit 30 operates a Carnot cycle, with the first heat exchanger 32 operating as a condenser and the second heat exchanger 36 operating as an evaporator. The second heat transfer fluid draws heat from the return air in the return heat exchanger 24. The refrigerant draws heat from the second heat transfer fluid in the second heat exchanger 36. The refrigerant passes heat to the first heat transfer fluid in the first heat exchanger 32. The first heat transfer fluid passes heat to the supply air in the supply heat exchanger 22. This allows cool air from the atmosphere 20 to be heated in the supply passage 14 before it is supplied to the occupied area 18.

In the refrigeration mode, the vapour-compression circuit 30 operates a Carnot cycle, with the second heat exchanger 36 operating as a condenser and the first heat exchanger 32 operating as an evaporator. The first heat transfer fluid draws heat from the supply air in the supply heat exchanger 22. The refrigerant draws heat from the first heat transfer fluid in the first heat exchanger. The refrigerant passes heat to the second heat transfer fluid in the second heat exchanger 36. The second heat transfer fluid passes heat to the return air in the return heat exchanger 24. This allows warm air from the atmosphere 20 to be cooled in the supply passage 14 before it is supplied to the occupied area 18.

To switch between the two modes, reversed valve system is engaged to reverse the refrigerant flow direction in the vapour-compression circuit 30.

In both the heat pump and the refrigeration mode, the first pump 42 is controllable to control flow rate of first heat transfer fluid to the air supply passage 14, and the second pump 50 is controllable to control flow rate of second heat transfer fluid to the return-from-area passage 16. The refrigerant operating pressure is controlled by controlling the flow rate of the first and second heat transfer fluids. This allows the low evaporating pressure and the high condensing pressure in the vapour-compression circuit to be maintained, allowing the efficiency of the heat pump/refrigerant to be increased. Additionally, the speed of the compressor can be varied to control the required flow rate and capacity of the vapour-compression circuit.

Some additional modifications/variations are described below.

In another example (not shown), the vapour compression circuit comprises a variable compressor and a fixed speed compressor operating in tandem. This is particularly suited to small capacity air handling systems. In another example (not shown), the vapour compression circuit comprises a pair of variable speed compressors operating independently. This reduces the quantity of refrigerant in each circuit for larger air handling systems.

Figure 2:
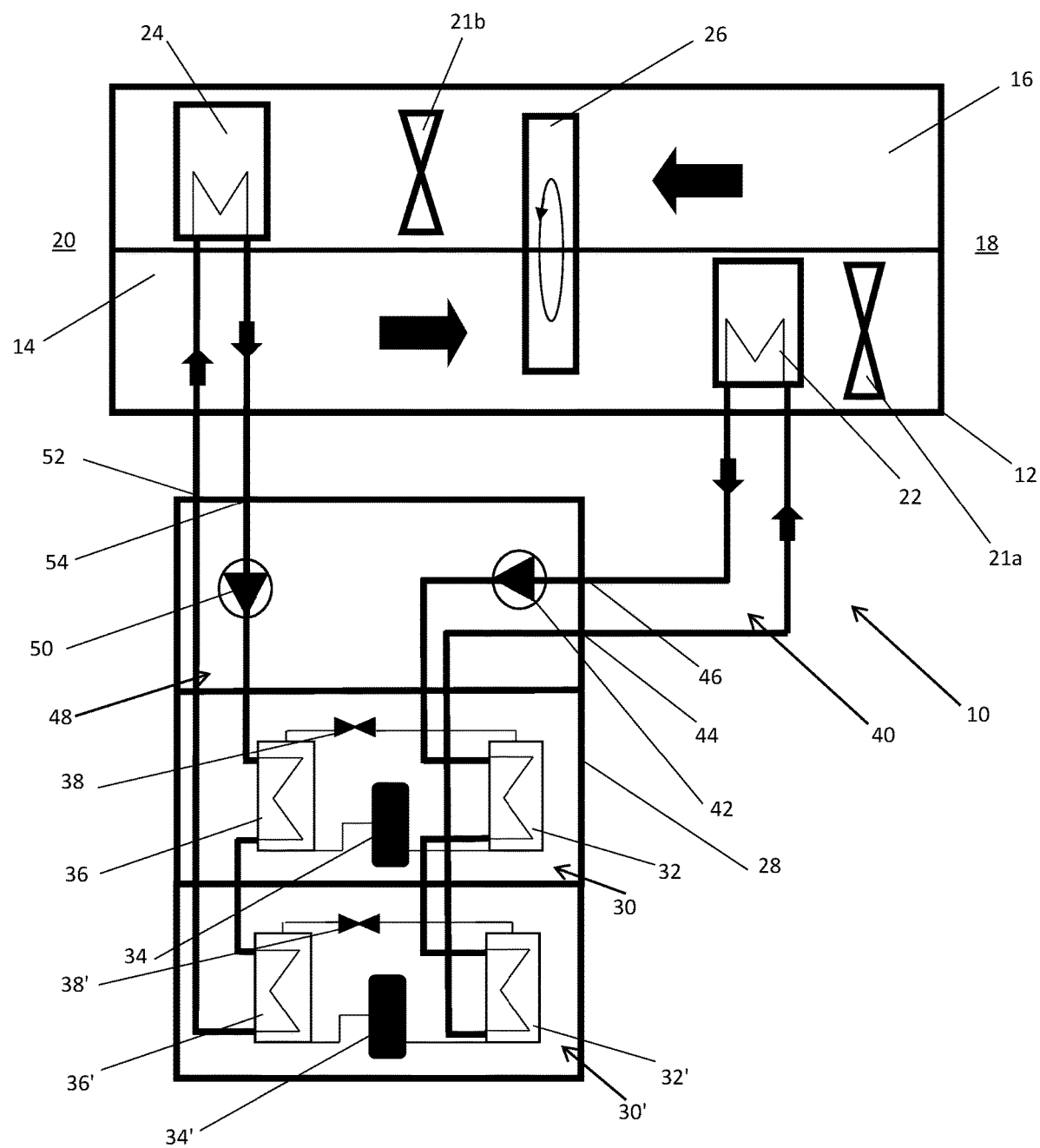

In another example, as (shown in FIG. 2), the remote heat transfer device comprises a second vapour-compression circuit 30', the second vapour-compression circuit comprising a third heat exchanger 32' adapted to exchange heat between a second refrigerant in the second vapour compression circuit and the first heat transfer fluid. Additionally, the second vapour-compression circuit 30' comprises a fourth heat exchanger 36' adapted to exchange heat between the second refrigerant and the second heat transfer fluid. Other components of the second vapour compression circuit 30', namely the compressor 34' and expansion valve 38' correspond to the equivalents in the first vapour-compression circuit 30. While this example requires a remote heat transfer device of increased complexity, using two independent circuits reduces the amount of refrigerant required in each circuit to achieve the same total heating/cooling. This keeps the flammable charge below the maximum allowable limit for safe operation, which is typically 5 kg. The minimum operational capacity for a compressor is typically 20%, so using two circuits gives a total unit minimum capacity of 10%, which provides improved flexibility in heating and cooling fresh air, to achieve the required supply air temperature at moderate atmospheric temperature.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The inventionn claimed is:

1. A remote heat transfer device for use with an air handling unit, the remote heat transfer device comprising:
 a vapour-compression circuit, the vapour-compression circuit comprising a first heat exchanger adapted to exchange heat between a refrigerant in the vapour compression circuit and a first heat transfer fluid; and
 a first outlet arranged to provide the first heat transfer fluid to an air supply passage of the air handling unit, so that the first heat transfer fluid exchanges heat with supply air passing through the air supply passage,
 wherein the vapour compression circuit comprises a second heat exchanger adapted to exchange heat with a second heat transfer fluid, the remote heat transfer device comprising a second outlet arranged to provide the second heat transfer fluid to a return-from-area passage of the air handling unit, so that the second heat transfer fluid exchanges heat with return air passing through the return-from-area passage,
 wherein the remote heat transfer device is arranged to operate in a heat pump mode, and, in the heat pump mode, the remote heat transfer device heats the first heat transfer fluid using the first heat exchanger so as to heat the supply air.

2. A remote heat transfer device according to claim 1 comprising a first inlet adapted to receive first heat transfer fluid returned from the air handling unit, the first inlet in fluid communication with the first outlet via the first heat exchanger to form a first circulation system.

3. A remote heat transfer device according to claim 1 comprising a first pump for pumping first heat transfer fluid to the air supply passage, the first pump controllable to control flow rate of first heat transfer fluid to the air supply passage.

4. A remote heat transfer device according to claim 1 comprising a second inlet adapted to receive the second heat transfer fluid returned from the air handling unit, the second inlet in fluid communication with the second outlet via the second heat exchanger to form a second circulation system.

5. A remote heat transfer device according to claim 1 comprising a second pump for pumping second heat transfer fluid to the return from-area passage, the second pump controllable to control flow rate of second heat transfer fluid to the return-from-area passage.

6. A remote heat transfer device according to claim 1, wherein in the heat pump mode, the remote heat transfer device draws heat from the second heat transfer fluid using the second heat exchanger.

7. A remote heat transfer device according to claim 1, wherein the remote heat transfer device is arranged to operate in a refrigeration mode, and in the refrigeration mode, the remote heat transfer device cools the first heat transfer fluid using the first heat exchanger so as to cool the supply air.

8. A remote heat transfer device according to claim 7, wherein in the refrigeration mode, the remote heat transfer device heats the second heat transfer fluid using the second heat exchanger.

9. A remote heat transfer device according to claim 1, wherein the remote heat transfer device is arranged to operate in a refrigeration mode and in the refrigeration mode the remote heat transfer device cools the first heat transfer fluid using the first heat exchanger so as to cool the supply air and
 wherein in the heat pump mode and in the refrigeration mode, the vapour compression circuit operates a Carnot cycle.

10. A remote heat transfer device according to claim 1, wherein the vapour compression circuit comprises the refrigerant, the refrigerant having a GWP value less than or equal to 650.

11. A remote heat transfer device according to claim 10, wherein the vapour compression circuit comprises the refrigerant, the refrigerant having a GWP value less than or equal to 3.

12. A remote heat transfer device according to claim 1, wherein the refrigerant is R290.

13. A remote heat transfer device according to claim 1, wherein the first heat transfer fluid is water.

14. An air handling system comprising a remote heat transfer device according to claim 1 and an air handling unit, the air handling unit comprising an air supply passage for receiving supply air from the atmosphere and supplying the supply air therefrom for delivery to an occupied area,
 wherein the air supply passage comprises a supply heat exchanger adapted to receive first heat transfer fluid from a remote heat transfer device, the supply heat exchanger adapted to exchange heat between the first heat transfer fluid and the supply au.

15. An air handling system according to claim 14 comprising a return- from-area passage for receiving return air from the occupied area and supplying the return air to the atmosphere, wherein the return-from-area passage comprises a return heat exchanger in fluid communication with the second outlet of the remote heat transfer device to receive second heat transfer fluid from the remote heat transfer device, the return heat exchanger adapted to exchange heat between the second heat transfer fluid and the return air.

16. An air handling system according to claim 14 comprising a recovery wheel for exchanging heat between the return air and the supply air.

17. A method of air handling, the method comprising:

exchanging heat between a refrigerant in a vapour-compression circuit and a first heat transfer fluid;

providing the first heat transfer fluid to an air supply passage, wherein the air supply passage receives supply air from the atmosphere and supplies the supply air therefrom, for delivery to a room;

exchanging heat between the first heat transfer fluid and the supply air in the air supply passage;

exchanging heat between the refrigerant in the vapour-compression circuit and a second heat transfer fluid;

providing the second heat transfer fluid to a return-from-area passage, wherein the return-from-area passage receives return air from the room and supplies the return air to the atmosphere; and exchanging heat between the second heat transfer fluid and the return air, further comprising the step of operating in a heat pump mode by heating the first heat transfer fluid using the first heat exchanger so as to heat the supply air.

\* \* \* \* \*